United States Patent [19]
Moriguchi et al.

[11] 3,855,687
[45] Dec. 24, 1974

[54] APPARATUS FOR FEEDING FLANGES

[75] Inventors: Shigeru Moriguchi; Tetsuo Takeuchi, both of Chibaken; Yuzi Saito, Kanagawaken, all of Japan

[73] Assignee: Mitsui Shipbuilding and Engineering Co., Ltd., Tokyo, Japan

[22] Filed: May 24, 1973

[21] Appl. No.: 363,504

[30] Foreign Application Priority Data
 May 29, 1972 Japan.............................. 47-53083

[52] U.S. Cl.............................................. 29/211 C
[51] Int. Cl............................................. B23q 7/10
[58] Field of Search.......... 29/211 C, 211 R, 211 D, 29/208 D

[56] References Cited
UNITED STATES PATENTS
3,061,147  10/1962  Vilmerding...................... 29/211 C

*Primary Examiner*—Thomas H. Eager
*Attorney, Agent, or Firm*—Howson and Howson

[57] ABSTRACT

Apparatus for feeding flanges into a flange welding machine in which the fed flange is to be welded to an end of a pipe, which has a chute for rolling the flange discharged from flange magazines. The chute is divided into two chutes one of which has a slant whereby the flange rolling in the chute is inverted before reaching the flange welding machine. Thus two flanges may be welded to the opposite ends of a pipe.

1 Claim, 5 Drawing Figures

APPARATUS FOR FEEDING FLANGES

The present invention relates to an apparatus for feeding flanges to a flange welding machine in which the fed flange is welded to an end of a pipe.

There is a type of flange of which both sides shapes are different from each other, that is the outside face of the flange is different from the inner side face in sectional shape.

Therefore, it is an object to provide a flange feeding apparatus which may feed flanges to the welding machine in the proper position to be welded to the end of pipe.

Figure 1:
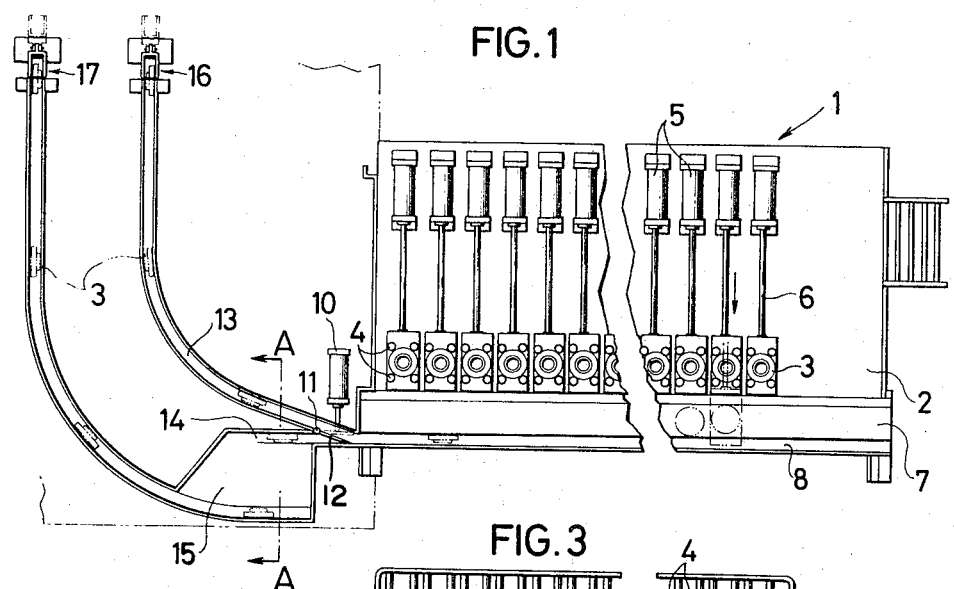
FIG. 1 is a plan view of a flange feeding apparatus in accordance with the present invention.
Figure 3:
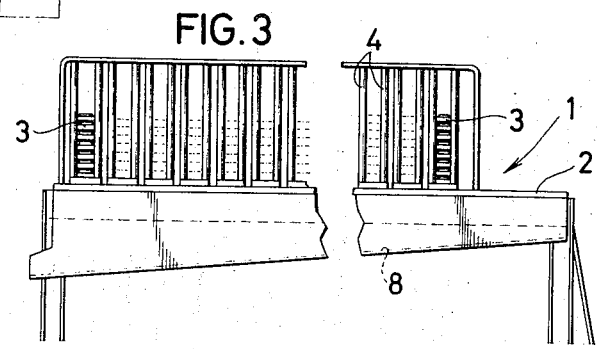
FIG. 3 is a front view of the apparatus.
Figure 2:
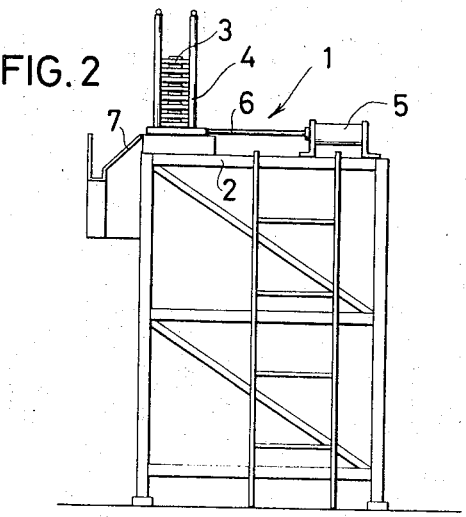
FIG. 2 is a side view as viewed from right side of FIG. 1.
Figure 4:
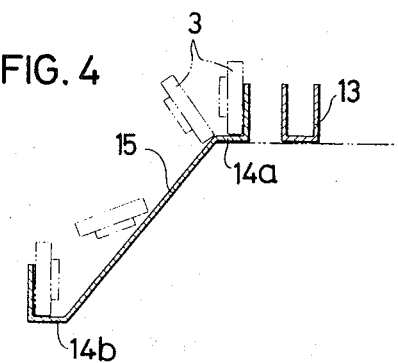
FIG. 4 is a sectional view taken on line A—A of FIG. 1.

Referring to FIGS. 1 to 3, numeral 1 designates a flange storage which comprises a table 2 and a plurality of magazines 4 for various sizes of flanges 3. On the table 2, air cylinders 5 are provided at each magazine so that the lowermost flange may be pushed from the magazine to a chute 7 by a reciprocating motion of the piston rod 6. Below the chute 7, a slant trough or chute 8 is provided and at the terminal end of the slant trough is provided a switching blade 12 is actuated to be rotated about 11 by air cylinder 10. The passage of the trough 8 is switched to one or the other of the two chutes 13 or 14 by the switching blade 12. As shown in FIG. 4, the chute 14 comprises an upper chute 14a and lower chute 14b and both chutes are communicated by a slope 15, whereby the flange 3 passing along the upper chute 14a falls on the lower chute along the slope and is inverted by the slope.

Figure 5:
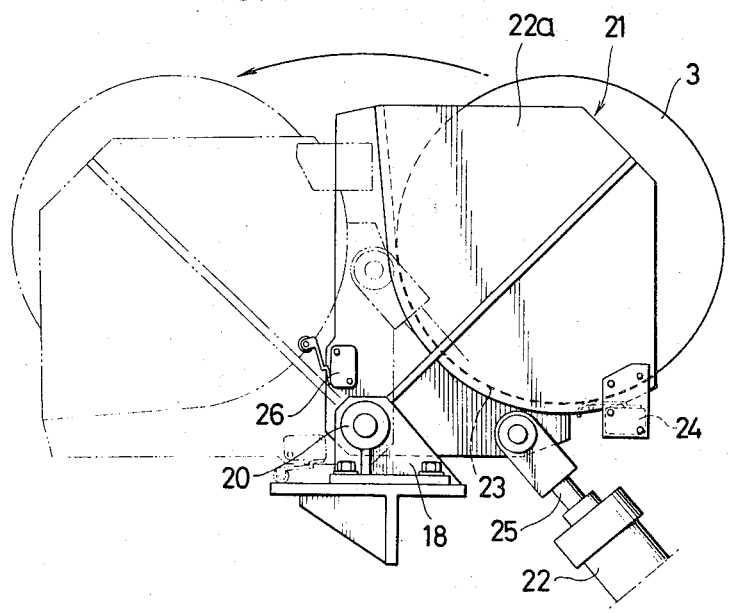
FIG. 5 is a side view of a flange receiving device.

At the terminal ends of chutes 13 and 14, flange receiving devices 16 and 17 are provided respectively. Each flange receiving device comprises a receiving cradle 21 which is rotatable on bracket 18 by a pin 20 as shown in FIG. 5 and is adapted to be rotated by a piston rod 25 of an air cylinder 22. The receiving cradle 21 comprises a pair of side plates 22a and arcuate bottom plate 23. On the underside of the bottom plate is provided a limit switch 24 the actuating lever of which projects from the bottom plate into the receiving cradle to be actuated by a received flange. When the limit switch is actuated, the air cylinder 22 is operated to project the piston rod 25 to rotate the cradle 21 in the counterclockwise direction.

In general operation, a required flange is selected from magazines 4 and discharged to the chute 8 by operation of the cylinder 5. The discharged flange rolls on the chute 8 and is introduced into the chute 13 or 14 and to receiving device 16 or 17 by the operation of the switching blade 12 according to welding demand. The flange received in the receiving cradle 21 is fed to a flange welding machine by rotation of the cradle. When the cradle reaches to the dotted line position in FIG. 5, the limit switch 26 is actuated by the cradle, whereby the air cylinder 22 is reversely actuated and the cradle is returned to the initial position.

What is claimed is:

1. An apparatus for feeding flanges, comprising magazines for storing various flanges, flange discharging means for each magazine, a chute system having forked chutes for rolling the discharged flange, one of the forked chutes having a slant for inverting the rolling flange, and receiving devices for receiving the rolling flange before introducing them into a flange welding machine.

* * * * *